United States Patent
Leung et al.

(10) Patent No.: US 10,980,196 B2
(45) Date of Patent: Apr. 20, 2021

(54) PERFORATED SUBIRRIGATION/DRAINAGE PIPE AND SEALED FULLY AUTOMATICALLY IRRIGATED RAINWATER-RECYCLING COMPREHENSIVE PLANTER

(71) Applicant: Yan Ming Leung, Hong Kong (CN)

(72) Inventors: Yan Ming Leung, Hong Kong (CN); Pik Seung Leung, Hong Kong (CN)

(73) Assignee: Yan Ming Leung, Hong Kong (CN)

( * ) Notice: Subject to any disclaimer, the term of this patent is extended or adjusted under 35 U.S.C. 154(b) by 821 days.

(21) Appl. No.: 15/569,756

(22) PCT Filed: Oct. 17, 2016

(86) PCT No.: PCT/CN2016/102292
§ 371 (c)(1),
(2) Date: Oct. 26, 2017

(87) PCT Pub. No.: WO2017/067426
PCT Pub. Date: Apr. 27, 2017

(65) Prior Publication Data
US 2018/0125018 A1    May 10, 2018

(30) Foreign Application Priority Data
Oct. 19, 2015 (CN) .......................... 201510677654.2

(51) Int. Cl.
*A01G 25/06* (2006.01)
*A01G 27/00* (2006.01)
(Continued)

(52) U.S. Cl.
CPC .............. *A01G 25/06* (2013.01); *A01G 9/023* (2013.01); *A01G 25/167* (2013.01);
(Continued)

(58) Field of Classification Search
CPC ...... A01G 25/06; A01G 25/16; A01G 25/162; A01G 25/165; A01G 25/167; A01G 27/00;
(Continued)

(56) References Cited

U.S. PATENT DOCUMENTS 2,674,490 A * 4/1954 Richards .............. A01G 25/167
239/64
2,851,306 A * 9/1958 Huffaker ................ A01G 25/02
239/450
(Continued)

FOREIGN PATENT DOCUMENTS

WO    WO-2014198240 A1 * 12/2014 ............ E02B 11/005

*Primary Examiner* — Monica L Barlow
*Assistant Examiner* — Michael A. Fabula (57) ABSTRACT

A perforated subirrigation and drainage pipe includes a pipe body and a permeation irrigation inner pipe. The permeation irrigation inner pipe is integrally formed with the pipe body and disposed at a top of an interior of the pipe body along a longitudinal direction thereof; multiple irrigation perforations, distributed along a longitudinal direction of the permeation irrigation inner pipe, are provided on a pipe wall of a bottom thereof; and an opening is provided on a pipe wall of a bottom of the pipe body; two flow guide baffles are respectively located at two sides of the opening and on an inner wall of the pipe body; a first irrigation and drainage channel is formed between each flow guide baffle and an outer wall of the permeation irrigation inner pipe, between each flow guide baffle and the inner wall of the pipe body, and between the two flow guide baffles.

4 Claims, 4 Drawing Sheets

(51) Int. Cl.
  *E03F 1/00* (2006.01)
  *A01G 9/02* (2018.01)
  *A01G 25/16* (2006.01)
  *E03B 3/02* (2006.01)
  *E03F 3/04* (2006.01)
  *G05D 9/12* (2006.01)

(52) U.S. Cl.
  CPC .............. *A01G 27/005* (2013.01); *E03B 3/02* (2013.01); *E03F 1/00* (2013.01); *E03F 3/04* (2013.01); *G05D 9/12* (2013.01)

(58) Field of Classification Search
  CPC .. A01G 27/003; A01G 27/005; A01G 27/008; A01G 9/022; A01G 9/023; E02B 11/00; E02B 11/005
  See application file for complete search history.

(56) References Cited

U.S. PATENT DOCUMENTS

| | | | | |
|---|---|---|---|---|
| 3,080,124 A | * | 3/1963 | Rathmann | A01G 25/02 239/450 |
| 3,797,754 A | * | 3/1974 | Spencer | A01G 25/02 239/542 |
| 4,033,072 A | * | 7/1977 | Kobayashi | A01G 9/023 47/62 R |
| 4,040,436 A | * | 8/1977 | Caldwell | A01G 25/167 137/78.3 |
| 4,061,272 A | * | 12/1977 | Winston | A01G 25/06 405/45 |
| 4,188,154 A | * | 2/1980 | Izatt | A01G 25/06 405/38 |
| 4,904,112 A | * | 2/1990 | McDonald | A01G 25/06 405/36 |
| 5,074,708 A | * | 12/1991 | McCann, Sr. | E01C 13/02 405/38 |
| 5,106,235 A | * | 4/1992 | King | A01G 25/06 138/118 |
| 5,209,015 A | * | 5/1993 | De Filippi | A01G 27/003 47/48.5 |
| 6,705,542 B2 | * | 3/2004 | Calbo | A01G 25/167 239/63 |
| 7,118,669 B1 | * | 10/2006 | Branz | C02F 1/006 210/170.08 |
| 7,300,577 B1 | * | 11/2007 | Branz | C02F 3/288 210/170.08 |
| 7,769,494 B1 | * | 8/2010 | Simon | A01G 25/165 700/284 |
| 7,809,475 B2 | * | 10/2010 | Kaprielian | A01C 23/042 700/284 |
| 10,728,643 B2 | * | 7/2020 | Solak | H04R 1/04 |
| 2008/0226393 A1 | * | 9/2008 | Leun | E02B 11/005 405/43 |
| 2010/0176216 A1 | * | 7/2010 | Cheung | E02B 11/005 239/201 |
| 2010/0284744 A1 | * | 11/2010 | Ohlin | A01G 25/06 405/49 |
| 2011/0232185 A1 | * | 9/2011 | Ahmadi | A01G 27/04 47/66.6 |
| 2012/0107048 A1 | * | 5/2012 | Agadi | A01G 25/06 405/45 |
| 2013/0272791 A1 | * | 10/2013 | Bayley | A01G 25/02 405/37 |
| 2016/0201284 A1 | * | 7/2016 | Gu | E02B 11/005 405/45 |

\* cited by examiner

PERFORATED SUBIRRIGATION/DRAINAGE PIPE AND SEALED FULLY AUTOMATICALLY IRRIGATED RAINWATER-RECYCLING COMPREHENSIVE PLANTER

CROSS REFERENCE OF RELATED APPLICATION

This is a U.S. National Stage under 35 U.S.C 371 of the International Application PCT/CN2016/102292, filed Oct. 17, 2016, which claims priority under 35 U.S.C. 119(a-d) to CN 201510677654.2, filed Oct. 19, 2015.

BACKGROUND OF THE PRESENT INVENTION

Field of Invention

The present invention relates to a technical field of water supply and drainage, and more particularly to a perforated subirrigation and drainage pipe and a fully automatically irrigated rainwater-recycling planter.

Description of Related Arts

The road drainage system used in the road is generally provided with a drainage channel between the curbs and the road, the drainage channel is connected with multiple drainage wells; or the curbs are directly paved at two sides of the road, a drainage well with grids is spacedly located on the curbs.

Although a series of closed structures, such as buried curbs, masonry shoulders and grouted retaining walls, have been designed for road extraneous water to partially solve the erosion of road extraneous water, the discharge of internal water that infiltrates the road surface is neglected. However, it is inevitable that rainy season water infiltrate the asphalt surface layer or the cement concrete surface layer; unfortunately, in the general road design, the drainage of the interior of the pavement structure is not mostly considered.

Although drainage pipes are adopted at many places which needs drainage, all kinds of debris in the water cause the pipe congestion in the process of usage. It is unknown for the specific congestion positions, so the dredge difficulty is higher; and especially in the rainy day, water is easy to enter the drainage pipes and no way to discharge the water, which causes the plant death due to excessive water. However, the perforated subirrigation and drainage pipe provided by the present invention imitates the underground irrigation method, which utilizes the capillary action and siphon principle of the water, added with the transpiration of the plants, to create a return to the state of nature for the plants, so that the plants comfortably breathe and freely absorb the water.

In addition, the deficiencies of the traditional potting methods hinder people who hope to try to plant. For example, too much water at the bottom of the planter causes the mosquito problem; the irrigation is too much or too little; the gap between the soil is too small, causing the plants are unable to normally breathe; wrong fertilization causes that the plants burn the roots. The planter based on the perforated subirrigation and drainage pipe provided by the present invention makes the growers clearly grasp the situations of the plants, so as to properly fertilize, irrigate, and reduce the waste of the irrigation water, and even reduce the amount of fertilizer, the reason of which is that the original nutrients in the soil are not washed away and have no fertilizer pollution as the traditional potting methods.

SUMMARY OF THE PRESENT INVENTION

Aiming at deficiencies in the prior art, the present invention provides a perforated subirrigation and drainage pipe and a fully automatically irrigated rainwater-recycling planter, which are able to effectively avoid pipe blockage, and are easy to be dredged and processed.

To achieve the above object, the present invention provides a perforated subirrigation and drainage pipe, which comprises a pipe body and a permeation irrigation inner pipe with a length smaller than or equal to the pipe body, wherein:

the permeation irrigation inner pipe is integrally formed with the pipe body and disposed at a top of an interior of the pipe body along a longitudinal direction of the pipe body;

multiple irrigation perforations, distributed along a longitudinal direction of the permeation irrigation inner pipe, are provided on a pipe wall of a bottom of the permeation irrigation inner pipe; and an opening is provided on a pipe wall of a bottom of the pipe body;

two flow guide baffles are respectively located at two sides of the opening and on an inner wall of the pipe body, wherein:

the two flow guide baffles comprise two first vertical plates perpendicularly to the pipe wall of the bottom of the pipe body and two first folded plates bending towards the inner wall of the pipe body, respectively;

the two first vertical plates and the two first folded plates are integrally formed, respectively;

two reinforcing baffles are disposed between the outer wall of the permeation irrigation inner pipe and the two flow guide baffles, respectively; the two reinforcing baffles are integrally formed on the inner wall of the pipe body;

a first irrigation and drainage channel, which is provided within the pipe body, comprises:

a first irrigation and drainage sub-channel provided between an inner surface of the two first vertical plates;

two second irrigation and drainage sub-channels provided between the inner wall of the pipe body and an outer surface of the flow guide baffles, respectively;

a second irrigation and drainage channel, formed by the two reinforcing baffles, the outer wall of the permeation irrigation inner pipe and the inner wall of the pipe body, is provided within the pipe body, in such a manner that a part of water in the permeation irrigation inner pipe passes through the multiple irrigation perforations and the opening in turn and then is drained out of the pipe body, and a remaining part of the water is drained out of the pipe body through the first irrigation and drainage channel and the second irrigation and drainage channel.

To achieve the above object, the present invention also provides a fully automatically irrigated rainwater-recycling planter, which comprises a water tank and at least two planter bodies, wherein the planter bodies are distributed up and down; a bottom of every planter body is sealed; there is the perforated subirrigation and drainage pipe located in every planter body; one end of multiple perforated subirrigation and drainage pipes is connected and communicated with an irrigation pipe, the other end of the multiple perforated subirrigation and drainage pipes is connected and communicated with a return pipe; a bottom of the return pipe is located within the water tank, a water pump in the water tank is connected with the irrigation pipe; the water pump draws water from the water tank and the water flows into the irrigation pipe; and then the water in the irrigation pipe flows into the corresponding planter bodies through the perforated subirrigation and drainage pipes; and then the remaining water in the perforated subirrigation and drainage pipes is recycled into the water tank through the return pipe.

Preferably, a one-way check valve is disposed on the irrigation pipe which is located between the water pump and the lowest planter body for controlling the water in the irrigation pipe; when the one-way check valve is switched on, the water pump draws the water from the water tank to the irrigation pipe; when the one-way check valve is switched off, the water pump stopping providing the water for the irrigation pipe.

Preferably, a water level sensor is located at one side of the water tank, a recovery valve is located at another side of the water tank, the water level sensor is electrically connected with an input end of a controller, an output end of the controller is electrically connected with the recovery valve; the water level sensor is adapted for sensing water level signals in the water tank, the controller is adapted for processing the water level signals; if the water level is too high, then the recovery valve is switched on to recycle and store the water in the water tank; if the water level is normal, the recovery valve is switched off.

Preferably, there is a fertilizer sensor for sensing fertilizer quantity and a moisture sensor for sensing moisture placed in every planter body; the fertilizer and the moisture sensor are respectively electrically connected with the input end of the controller, a communication end of the controller is connected with a mobile intelligent device; the controller processes information which is sensed by the fertilizer sensor and the moisture sensor, if the fertilizer or moisture is too low, too-low signals are sent to the mobile intelligent device through network to notice adding water or fertilizer.

Preferably, multiple diversion pipes are connected between the return pipe and the irrigation pipe, and one diversion pipe is correspondingly disposed in every planter body; an upper end of the return pipe is opened to allow external air to enter the planter bodies through the perforated subirrigation and drainage pipes and the diversion pipes.

Beneficially effects of the present invention are as follows. Compared with the prior art, for the perforated subirrigation and drainage pipe and fully automatically irrigated rainwater-recycling planter, (1) There is the permeation irrigation inner pipe located on the central axis of the pipe body; there are the multiple irrigation perforations distributed along the central axis of the permeation irrigation inner pipe and provided on the pipe wall of the permeation irrigation inner pipe; one end of the permeation irrigation inner pipe is connected with an irrigation pipe; water is introduced into the permeation irrigation inner pipe through the irrigation pipe, and then passes through the multiple irrigation perforations and the opening in turn, and then is drained out of the pipe body to irrigate plants; through the irrigation perforations, the water from the permeation irrigation inner pipe is consistent in pressure and is uniform and soft, so that the water is able to be directly supplied to roots of the plants to keep the soil surface dry and reduce pests and diseases, thus ensuring that the roots of the plants breathe smoothly.

(2) There are the flow guide baffles located on the inner wall of the pipe body; through the flow guide baffles, multiple irrigation and drainage channels are formed in the pipe body to timely discharge the remaining water for recycling; through the flow guide baffles, the water is discharged from the soil in the event of heavy rain or flood to ensure that the plants will not be drowned in time; and the combination of the flow guide baffles and the permeation irrigation inner pipe is able to sufficiently utilize the internal space of the pipe to filter the water which passes through the pipe, thus effectively preventing the drainage pipe blockage.

(3) The perforated subirrigation and drainage pipe provided by the present invention imitates the underground irrigation method, which utilizes the capillary action and siphon principle of the water, added with the transpiration of the plants, to create a return to the state of nature for the plants, so that the plants comfortably breathe and freely absorb the water.

(4) The recycling planter based on the perforated subirrigation and drainage pipe has some advantages as follows. The water discharged from the pipe body is able to be collected into the water tank for later use; the perforated subirrigation and drainage pipes are easy to be installed and used, and the plants are able to be planted in any place as long as the pipes are installed in the water tank, which saves water and fertilizer to reduce plant costs, thereby improving residents' living. Furthermore, the planter reduces roof and vertical greening costs without polluting the environment, promotes simple and clean planting methods for planting more plants to reduce global warming and solve food problems.

(5) The planter based on the perforated subirrigation and drainage pipe provided by the present invention makes the growers clearly grasp the situations of the plants, so as to properly fertilize, irrigate, and reduce the waste of the irrigation water, and even reduce the amount of fertilizer, the reason of which is that the original nutrients in the soil are not washed away and have no fertilizer pollution as the traditional potting methods.

BRIEF DESCRIPTION OF THE DRAWINGS

Main elements are described as follows.

1: perforated subirrigation and drainage pipe; 10: pipe body; 11: permeation irrigation inner pipe; 12: flow guide baffle; 13: first irrigation and drainage channel; 14: reinforcing baffle; 15: second irrigation and drainage channel; 101: opening; 111: irrigation perforations; 121: first vertical plate; 122: first folded plate; 131: first irrigation and drainage sub-channel; 132: seventh irrigation and drainage sub-channel; 133: second irrigation and drainage sub-channel; 141: second vertical plate; 142: second folded plate; 143: transverse plate; 144: projection; 151: third irrigation and drainage sub-channel; 152: fourth irrigation and drainage sub-channel; 153: fifth irrigation and drainage sub-channel; 154: sixth irrigation and drainage sub-channel.

Main elements are described as follows.

2: water tank; 3: planter body; 4: irrigation pipe; 5: return pipe; 6: water pump; 7: one-way check valve; 8: diversion pipe; 21: water level sensor; 22: recovery valve; 31: fertilizer sensor; 32: moisture sensor.

DETAILED DESCRIPTION OF THE PREFERRED EMBODIMENT

To more clearly explain the present invention, the present invention is further described with accompanying drawings as follows.

Figure 1:
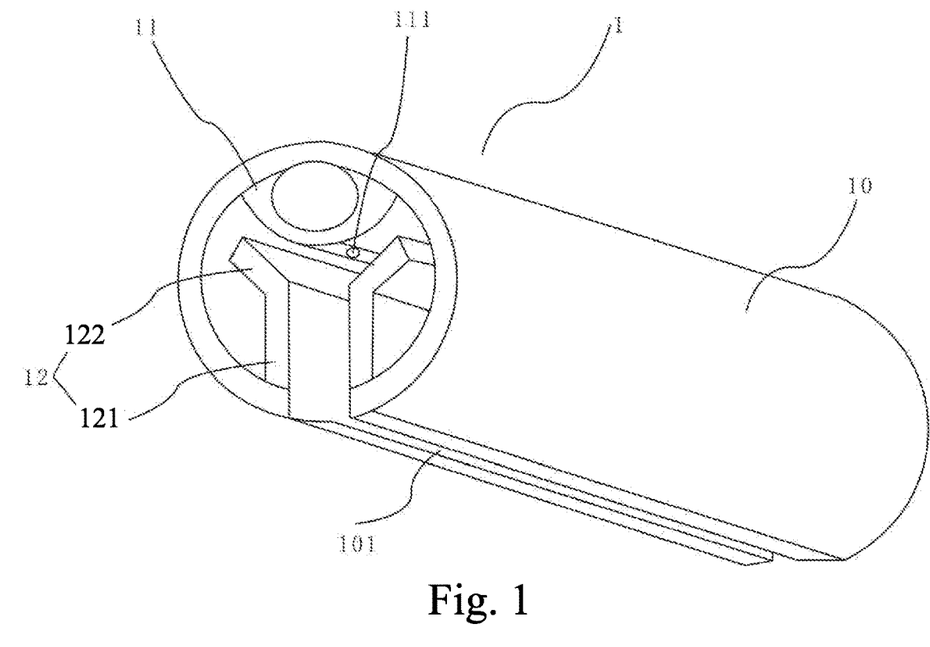
FIG. 1 is a dimensionally structurally schematic view of a perforated subirrigation and drainage pipe according to a preferred embodiment of the present invention.
Figure 2:
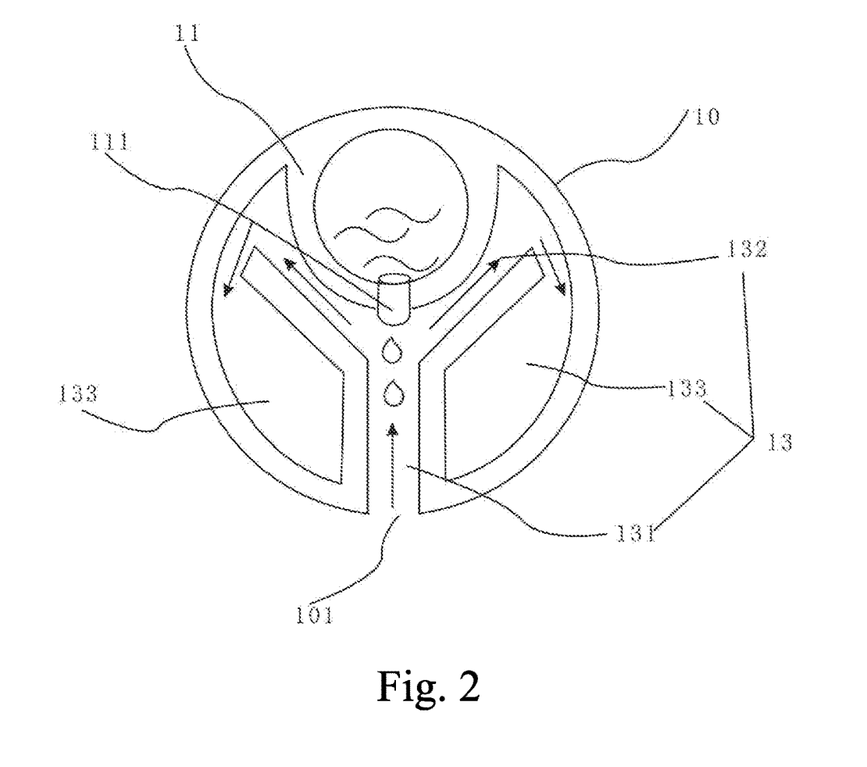
FIG. 2 is a longitudinally sectional view of FIG. 1.
Figure 3:
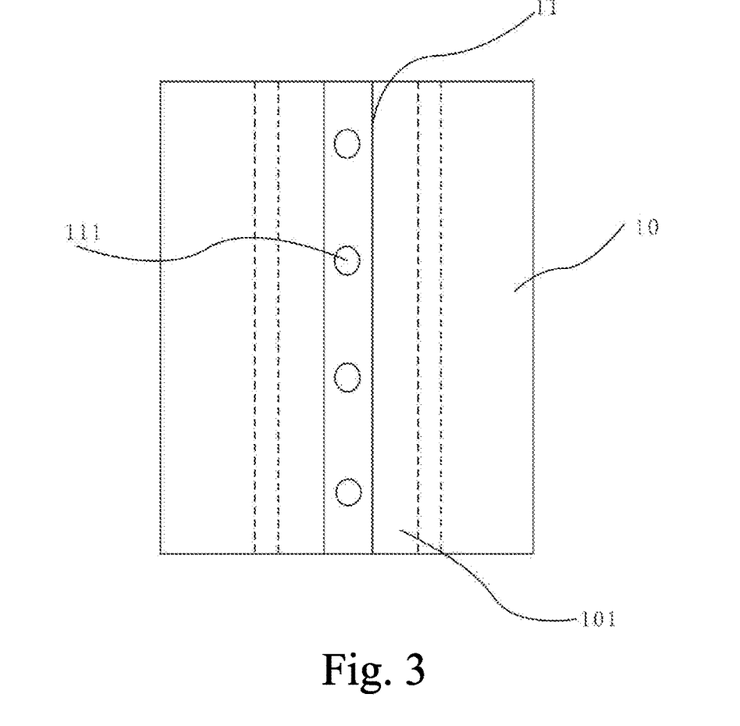
FIG. 3 is a horizontally sectional view of FIG. 1.

Referring to FIGS. 1 to 3, a perforated subirrigation and drainage pipe according to the present invention is illustrated, which comprises a pipe body 10 and a permeation irrigation inner pipe 11 with a length smaller than or equal to the pipe body 10, wherein the permeation irrigation inner pipe 11 is integrally formed with the pipe body 10 and disposed at a top of an interior of the pipe body 10 along a longitudinal direction thereof; multiple irrigation perforations 111, distributed along a longitudinal direction of the permeation irrigation inner pipe 11, are provided on a pipe wall of a bottom of the permeation irrigation inner pipe 11; and an opening 101 is provided on a pipe wall of a bottom of the pipe body 10;

two flow guide baffles 12 are respectively located at two sides of the opening and on an inner wall of the pipe body 10; a first irrigation and drainage channel 13 is formed between each flow guide baffle 12 and an outer wall of the permeation irrigation inner pipe 11, between each flow guide baffle 12 and the inner wall of the pipe body 10, and between the two flow guide baffles 12; a part of water in the permeation irrigation inner pipe 11 passes through the multiple irrigation perforations 111 and the opening 101 in turn and then is drained out of the pipe body, and then the remaining part of the water is drained out of the pipe body 10 through the first irrigation and drainage channel 13.

Compared with the prior art, the perforated subirrigation and drainage pipe provided by the present invention has beneficial effects as follows.

(1) There is the permeation irrigation inner pipe 11 located within the pipe body 10 along a longitudinal direction thereof; there are the multiple irrigation perforations 111 distributed along the longitudinal direction of the permeation irrigation inner pipe 11 and provided on the pipe wall of the bottom of the permeation irrigation inner pipe 11; one end of the permeation irrigation inner pipe 11 is connected with an irrigation pipe, water is introduced into the permeation irrigation inner pipe 11 through the irrigation pipe, and then passes through the multiple irrigation perforations 111 and the opening 101 in turn, and then is drained out of the pipe body to irrigate plants; through the irrigation perforations, the water from the permeation irrigation inner pipe is consistent in pressure and is uniform and soft, so that the water is able to be directly supplied to roots of the plants to keep the soil surface dry and reduce pests and diseases, thus ensuring that the roots of the plants breathe smoothly.

(2) There are the flow guide baffles 12 located on the inner wall of the pipe body 10; through the flow guide baffles 12, multiple irrigation and drainage sub-channels 131, 132 and 133 are formed in the pipe body 10 to timely discharge the remaining water for recycling; through the flow guide baffles 12, the water is discharged from the soil in the event of heavy rain or flood to ensure that the plants will not be drowned in time; and the combination of the flow guide baffles 12 and the permeation irrigation inner pipe 11 is able to sufficiently utilize the internal space of the pipe to filter the water which passes through the pipe, thus effectively preventing the drainage pipe blockage.

(3) The perforated subirrigation and drainage pipe provided by the present invention imitates the underground irrigation method, which utilizes the capillary action and siphon principle of the water, added with the transpiration of the plants, to create a return to the state of nature for the plants, so that the plants comfortably breathe and freely absorb the water.

In the present embodiment, every flow guide baffle 12 comprises a first vertical plate 121 perpendicularly to the pipe wall of the bottom of the pipe body 10 and a first folded plate 122 bending towards the pipe wall of the pipe body 10, wherein the first vertical plate 121 and the first folded plate 122 are integrally formed; the first irrigation and drainage channel is formed between the two first vertical plates 121, between the two first folded plates 122 and the outer wall of the permeation irrigation inner pipe 11, and between an outer surface of the two flow guide baffles 12 and the inner wall of the pipe body 10, respectively. Due to an amount of the first vertical plates 121 is two, a first irrigation and drainage sub-channel 131 is defined between an inner surface of the two first vertical plates 121 located at the two sides of the opening 101; two seventh irrigation and drainage sub-channels 132 are defined between the two first folded plates 122 and the outer wall of the permeation irrigation inner pipe 11, respectively; two second irrigation and drainage sub-channels 133 are defined between the outer surface of the two flow guide baffles 12 and the inner wall of the pipe body 10, respectively. The first irrigation and drainage sub-channel 131 is generally adapted for filtering larger particles, such as particles with a diameter of 2 mm; the two seventh irrigation and drainage sub-channels 132 are generally adapted for filtering smaller particles, such as particles with a diameter of 1.75 mm; the second irrigation and drainage sub-channels 133 are generally adapted for filtering the smallest particles, such as particles with a diameter of 1.5 mm. When the particles enter the first irrigation and drainage sub-channel 131, due to the moisture is infiltrated into the first irrigation and drainage sub-channel 131, the particles are unable to be driven to flow, causing the particles are precipitated in the first irrigation and drainage sub-channel 131, so that sediments and other particles are precipitated in the first irrigation and drainage sub-channel 131. However, if there is a sudden water pressure or the water pressure increases, the particles are pushed into the two seventh irrigation and drainage sub-channels 132, the two seventh irrigation and drainage sub-channels 132 filter some relatively smaller particles, and the second irrigation and drainage sub-channels 133 filter some much smaller particles, such that when the water flows into a drainage outlet below the second irrigation and drainage sub-channels 133, there will be only sediment particles with a diameter of less than 1.5 mm which are usually flowable with the water without blocking the pipe at the drainage outlet 5. The advantages are that even if all of the above irrigation and drainage sub-channels are filled with the sediment particles, the moisture can still flow from voids among the particles into the drainage outlet 5 and there is no blockage. Moreover, even after the blockage, the sediment particles in the irrigation and drainage sub-channels are quickly removed through flushing with high pressure water via the drainage outlets 5 at two sides, so as to clear the blockage. The formed irrigation and drainage sub-channels sufficiently utilize the internal space of the water pipe to filter the water, which achieves triple filtration to effectively prevent the pipeline blockage, and even when the sewage pipe is blocked, blockage locations are able to be accurately known to precisely clear blockage points.

Figure 4:
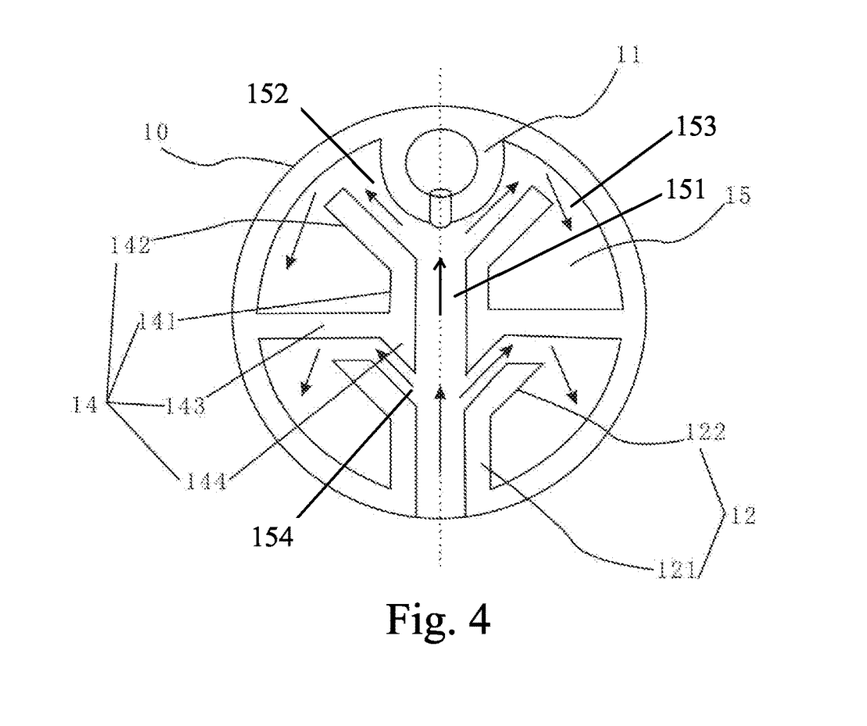
FIG. 4 shows that the perforated subirrigation and drainage pipe is provided with reinforcing baffles in the present invention.

Further referring to FIG. 4, two reinforcing baffles 14 are disposed between the outer wall of the permeation irrigation inner pipe 11 and the two flow guide baffles 12, respectively; every reinforcing baffle 14 is integrally formed on the inner wall of the pipe body 10; through the reinforcing baffles 14, a second irrigation and drainage channel 15 is formed among the flow guide baffles 12, the permeation irrigation inner pipe 11 and the pipe body 10; the remaining water in the pipe body 10 is drained out of the second irrigation and drainage channel 15 and the first irrigation and drainage channel 13. Through the reinforcing baffles 14, the pipe wall is strengthened, such that a bottom of the pipe body is not inwardly collapsed due to the opening 101 without losing the water inflow and drainage function. Simultaneously, through the reinforcing baffles 14, an amount of the irrigation and drainage channels is increased, so that the remaining water is timely and effectively discharged to obtain a better dredge effect. Every reinforcing baffle 14 comprises a second vertical plate 141, a second folded plate 142 and a transverse plate 143, wherein the second folded plate 142 and the transverse plate 143 are respectively connected with two ends of the second vertical plate 141; the second vertical plate 141, the second folded plate 142 and the transverse plate 143 are integrally formed; a junction of the second vertical plate 141 and the transverse plate 143 extends towards the opening to form a projection 144; the second irrigation and drainage channel 15 comprises a third irrigation and drainage sub-channel 151 formed between an inner surface of the two second vertical plates 141, two fourth irrigation and drainage sub-channels 152 provided between an inner surface of the two second folded plates 142 and the outer wall of the permeation irrigation inner pipe 11, two fifth irrigation and drainage sub-channels 153 provided between an outer surface of the two reinforcing baffles 14 and the inner wall of the pipe body 10, and two sixth irrigation and drainage sub-channels 154 provided between two projections 144 and an inner surface of the two first folded plates 122; the two sixth irrigation and drainage sub-channels 154 formed between the two projections 144 and the two first folded plates 122 are communicated with the two second irrigation and drainage sub-channels 133 formed between the outer surfaces of the two flow guide baffles 12 and the inner wall of the pipe body 10, respectively. The present invention is not limited to the specific structure of the reinforcing baffles 14, which is able to be improved according to an actual situation.

In the present embodiment, the pipe of FIG. 1 is able to be used as the first embodiment, and FIG. 4 is a multi-layer partition design which is able to be used as the second embodiment, indicating that the amount of the reinforcing baffles in the pipe body is optional. In general, the pipe body may be made from polyvinyl chloride, polyethylene or other materials.

Figure 5:
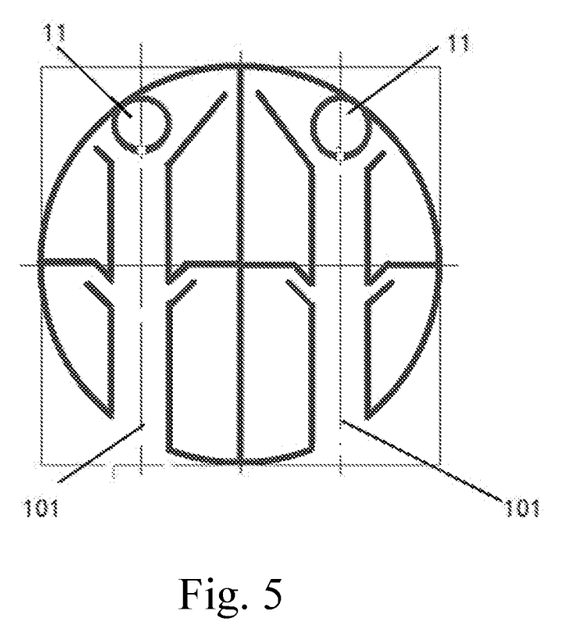
FIG. 5 shows a drainage combination pipe of a first kind of multi-layer permeation irrigation inner pipe of the present invention.
Figure 6:
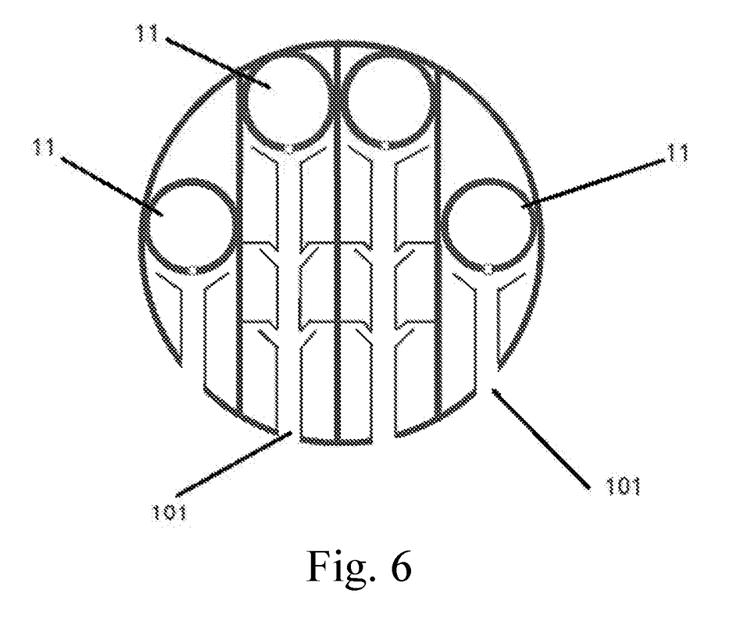
FIG. 6 shows a drainage combination pipe of a second kind of multi-layer permeation irrigation inner pipe of the present invention.

In addition, referring to FIGS. 5 to 6, the perforated subirrigation and drainage pipe of the present invention may be a drainage combination of the multi-layer permeation irrigation inner pipe. FIG. 5 shows two permeation irrigation inner pipes which are corresponding to two openings. FIG. 6 shows four permeation irrigation inner pipes which are corresponding to four openings. Of course, the present application is not limited to the above-mentioned several combinations, which is able to be changed according to the actual needs.

Figure 7:
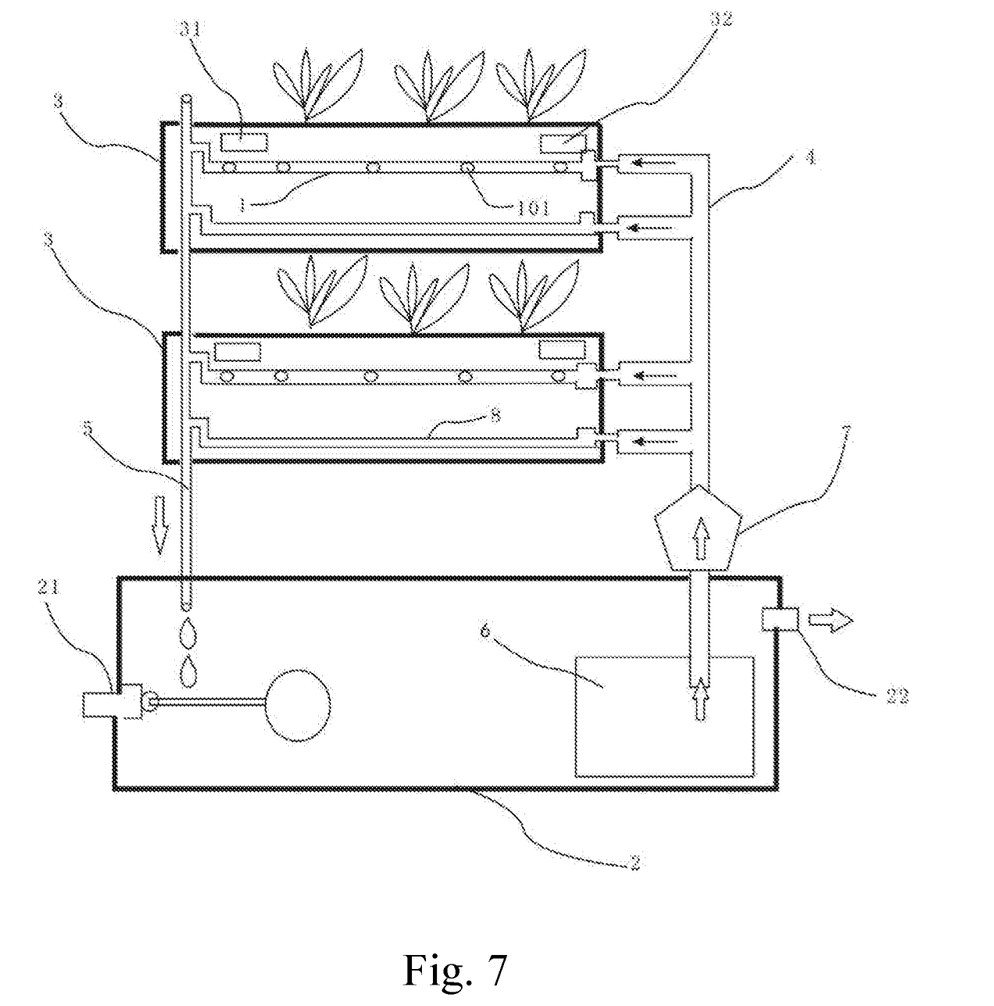
FIG. 7 is a schematic view of a fully automatically irrigated rainwater-recycling planter of the present invention.

Furthermore, referring to FIG. 7, the present invention also provides a fully automatically irrigated rainwater-recycling planter, which comprises a water tank 2 and at least two planter bodies 3, wherein the planter bodies 3 are distributed up and down; a bottom of every planter body 3 is sealed; there is the above-mentioned perforated subirrigation and drainage pipe 1 located in every planter body 3; one end of multiple perforated subirrigation and drainage pipes 1 is connected and communicated with an irrigation pipe 4, the other end of the multiple perforated subirrigation and drainage pipes 1 is connected and communicated with a return pipe 5; a bottom of the return pipe 5 is located within the water tank 2, a water pump 6 in the water tank 2 is connected with the irrigation pipe 4; the water pump 6 draws water from the water tank 2 and the water flows into the irrigation pipe 4; and then the water in the irrigation pipe 4 flows into the corresponding planter bodies 3 through the perforated subirrigation and drainage pipes 1; and then the remaining water in the perforated subirrigation and drainage pipes 1 is recycled into the water tank 2 through the return pipe 5.

The fully automatically irrigated rainwater-recycling planter, provided by the present invention, has beneficially effects as follows.

(1) The irrigation pipe introduces the water in the water tank into the permeation irrigation inner pipe of every planter body, and then the water is evenly drained to the plants through the multiple irrigation perforations and the opening in turn; through the irrigation perforations, the water from the permeation inner pipes is consistent in pressure, and is uniform and soft, so that the water is able to be directly supplied to the roots of the plants to keep the soil surface dry and reduce pests and diseases, thus ensuring that the roots of the plants breathe smoothly.

(2) The perforated subirrigation and drainage pipe planter, provided by the present invention, is able to make the growers clearly grasp the situation of the plants for rightly fertilize and irrigate, and is able to reduce the waste of the irrigation water, even reduce the amount of fertilizer, because the original nutrients in the soil are not washed away by the irrigation water and have no fertilizer contamination as traditional potted planting methods.

(3) The water drawn out of the pipe body is able to be collected into the water tank for subsequent usage.

(4) The perforated subirrigation and drainage pipe is convenient in usage and installation; and the plants are cultivated at any place as long as the pipe is installed in the water tank.

(5) The present invention saves the water and fertilizer, so that the cost of the plants is reduced, thereby improving the lives of the residents.

(6) The present invention reduces the cost of roof and vertical greening, and will not pollute the environment.

(7) The present invention promotes the simple and clean planting method, and more plants are cultivated to reduce global warming.

In this embodiment, a one-way check valve 7 is disposed on the irrigation pipe 4 which is located between the water pump 6 and the lowest planter body 3 for controlling the water in the irrigation pipe 4. When the one-way check valve 7 is switched on, the water pump 6 draws the water from the water tank 2 to the irrigation pipe 4; when the one-way check valve 7 is switched off, the water pump 6 stopping providing the water for the irrigation pipe 4. A water level sensor 21 is located at one side of the water tank 2, a recovery valve 22 is located at another side of the water tank 2, the water level sensor 21 is electrically connected with an input end of a controller, an output end of the controller is electrically connected with the recovery valve 22; the water level sensor 21 is adapted for sensing water level signals in the water tank 2, the controller is adapted for processing the water level signals; if the water level is too high, then the recovery valve 22 is switched on to recycle and store the water in the water tank 2; if the water level is normal, the recovery valve 22 is switched off. The above intelligent control effectively avoids that the water in the water tank is too high or too low, thereby ensuring the adequacy of plant growth moisture.

In this embodiment, there is a fertilizer sensor 31 for sensing fertilizer quantity and a moisture sensor 32 for sensing moisture placed in every planter body 3; the fertilizer 31 and the moisture sensor 32 are respectively electrically connected with the input end of the controller, a communication end of the controller is connected with a mobile intelligent device; the controller processes information which is sensed by the fertilizer sensor 31 and the moisture sensor 32, if the fertilizer or moisture is too low, too-low signals are sent to the mobile intelligent device through network to notice adding water or fertilizer, so that the users are able to timely obtain growing conditions of the plants, so as to avoid that the fertilizer and moisture for the plant growth is too low, thus ensuring the adequacy of plant growth nutrients. Multiple diversion pipes 8 are connected between the return pipe 5 and the irrigation pipe 4, and one diversion pipe 8 is correspondingly disposed in every planter body 3; an upper end of the return pipe 5 is opened to allow external air to enter the planter bodies 3 through the perforated subirrigation and drainage pipes 1 and the diversion pipes 8.

The planter provided by the present invention also has some advantages as follows.

(1) The planter sufficiently utilizes water resources based on up, down and all-around positions of the plant cultivation planter body, and after the water is irrigated, the excess water of the upper planter body can flow into the lower planter body to irrigate the plants, the excess water of the lower planter body and the rainwater are collected and recycled, thereby saving water.

(2) For the irrigated plants, the perforated subirrigation and drainage pipes not only provide the moisture needed by the plants, but avoid the damage to the plants due to excessive water.

(3) The planter bodies, disposed up, down and all-around, can reduce the occupied area, plant various plants in batches, and make full use of the space within the building, so that the present invention can be widely used in the family, office, desert, farm and other places.

(4) Combined with the automatically irrigating pump, the planter can automatically irrigate the plants when the plants are in water, which facilitates the daily watering and maintenance and achieves the plant cultivation without professionals, so that it meets the needs of increasingly urbanization.

The planter body in this embodiment is a regular hexagon or other shapes, these regular hexagons are arranged together to form a combination of green walls, so that the combined planter has better effects. In the above combination, a hexagonal frame is firstly installed, and then hexagonal planters are arbitrarily put into the frame to form different colors and plant varieties.

While only a few specific embodiments of the present invention have been disclosed, the present invention is not limited thereto, and any changes that occur to those skilled in the art are intended to fall within the protective scope of the present invention.

What is claimed is:

1. A perforated subirrigation and drainage pipe, which comprises a pipe body and a permeation irrigation inner pipe with a length smaller than or equal to the pipe body, wherein:

the permeation irrigation inner pipe is integrally formed with the pipe body and disposed at a top of an interior of the pipe body along a longitudinal direction of the pipe body;

multiple irrigation perforations, distributed along a longitudinal direction of the permeation irrigation inner pipe, are provided on a pipe wall of a bottom of the permeation irrigation inner pipe; and an opening is provided on a pipe wall of a bottom of the pipe body;

two flow guide baffles are respectively located at two sides of the opening and on an inner wall of the pipe body, wherein:

the two flow guide baffles comprise two first vertical plates perpendicularly to the pipe wall of the bottom of the pipe body and two first folded plates bending towards the inner wall of the pipe body, respectively;

the two first vertical plates and the two first folded plates are integrally formed, respectively;

two reinforcing baffles are disposed between the outer wall of the permeation irrigation inner pipe and the two flow guide baffles, respectively; the two reinforcing baffles are integrally formed on the inner wall of the pipe body;

a first irrigation and drainage channel, which is provided within the pipe body, comprises:

a first irrigation and drainage sub-channel provided between an inner surface of the two first vertical plates;

two second irrigation and drainage sub-channels provided between the inner wall of the pipe body and an outer surface of the flow guide baffles, respectively;

a second irrigation and drainage channel, formed by the two reinforcing baffles, the outer wall of the permeation irrigation inner pipe and the inner wall of the pipe body, is provided within the pipe body, in such a manner that a part of water in the permeation irrigation inner pipe passes through the multiple irrigation perforations and the opening in turn and then is drained out of the pipe body, and a remaining part of the water is drained out of the pipe body through the first irrigation and drainage channel and the second irrigation and drainage channel.

2. The perforated subirrigation and drainage pipe according to claim 1, wherein:

the two reinforcing baffles comprise two second vertical plates, two second folded plates and two transverse plates, respectively;

each of the two second folded plates and each of the two transverse plates are respectively connected with two ends of one of the second vertical plates;

the two second vertical plates, the two second folded plates and the two transverse plates are integrally formed, respectively;

two projections extended from junctions of the two second vertical plates and the two transverse plates towards the opening, respectively;

the second irrigation and drainage channel comprises:
a third irrigation and drainage sub-channel provided between an inner surface of the two second vertical plates;
two fourth irrigation and drainage sub-channels provided between the outer wall of the permeation irrigation inner pipe and an inner surface of the two second folded plates, respectively;
two fifth irrigation and drainage sub-channels provided between an outer surface of the two reinforcing baffles and the inner wall of the pipe body; and
two sixth irrigation and drainage sub-channels provided between the two projections and an inner surface of the two first folded plates, respectively;

the first irrigation and drainage channel is communicated with the second irrigation and drainage channel.

3. A fully automatically irrigated rainwater-recycling planter, which comprises a water tank, at least two planter bodies and multiple perforated subirrigation and drainage pipes according to claim 1, wherein:

the planter bodies are distributed up and down, a bottom of each of the planter bodies is sealed;

at least one of the multiple perforated subirrigation and drainage pipes is located in the each of the planter bodies;

one end of multiple perforated subirrigation and drainage pipes is connected and communicated with an irrigation pipe, the other end of the multiple perforated subirrigation and drainage pipes is connected and communicated with a return pipe;

a bottom of the return pipe is located within the water tank, a water pump in the water tank is connected with the irrigation pipe;

the water pump draws water from the water tank and the water flows into the irrigation pipe; and then the water in the irrigation pipe flows into the corresponding planter bodies through the perforated subirrigation and drainage pipes; and then the remaining water in the perforated subirrigation and drainage pipes is recycled into the water tank through the return pipe.

4. The fully automatically irrigated rainwater-recycling planter according to claim 3, wherein a one-way check valve is disposed on the irrigation pipe which is located between the water pump and a lowest planter body of the at least two planter bodies for controlling the water in the irrigation pipe, so that when the one-way check valve is switched on, the water pump draws the water from the water tank to the irrigation pipe; when the one-way check valve is switched off, the water pump stopping providing the water for the irrigation pipe.

* * * * *